United States Patent [19]

Darling

[11] Patent Number: 5,895,805

[45] Date of Patent: Apr. 20, 1999

[54] COMPOSITION OF POLY (DIMETHYLSILOXANE) AND MICROSPHERES

[75] Inventor: Graham D. Darling, Quebec, Canada

[73] Assignee: Marine Manufacturing Industries Inc., Ile des Soeurs, Canada

[21] Appl. No.: 08/697,971

[22] Filed: Sep. 3, 1996

[51] Int. Cl.$^6$ .............................. C08L 35/04; C08L 83/06
[52] U.S. Cl. ........................... 523/218; 523/223; 525/100
[58] Field of Search ....................... 528/10; 523/218, 523/223; 525/100

[56] References Cited

U.S. PATENT DOCUMENTS

| | | | |
|---|---|---|---|
| 4,000,108 | 12/1976 | Yokokawa et al. | 260/37 |
| 4,255,202 | 3/1981 | Swan, Jr. | 106/122 |
| 4,728,551 | 3/1988 | Jay | 428/76 |
| 4,861,804 | 8/1989 | Nakanishi | 521/54 |
| 5,202,362 | 4/1993 | Hermele | 523/218 |
| 5,358,719 | 10/1994 | Mellul et al. | 424/497 |
| 5,362,543 | 11/1994 | Nickerson | 428/76 |
| 5,421,874 | 6/1995 | Pearce | 106/122 |
| 5,459,959 | 10/1995 | Paradis | 43/44.89 |
| 5,507,866 | 4/1996 | Drew et al. | 524/860 |
| 5,607,993 | 3/1997 | Christy | 524/237 |

FOREIGN PATENT DOCUMENTS

| | | |
|---|---|---|
| 0 635 549 | 5/1994 | European Pat. Off. . |
| 2665706 | 2/1992 | France . |
| 4-173867 | 6/1992 | Japan . |

OTHER PUBLICATIONS

The Fisherman's Friend, Aqua Float Rod Floater-Brochure-1995.

*Primary Examiner*—Robert E. Sellers
*Attorney, Agent, or Firm*—Swabey Ogilvy Renault

[57] ABSTRACT

A composition useful as a bouyant putty comprises a continuous phase having a viscosity of greater than 100,000 cs and less than a viscosity corresponding to a penetration number of 500 containing a polydimethylsiloxane which is a mixture of a silicone fluid with a viscosity of not more 100,000 cs and a silicone gum possessing a penetration number of from 500 to 1500, and a discontinuous phase of hollow, gas-filled organic polymer microspheres.

18 Claims, No Drawings

COMPOSITION OF POLY (DIMETHYLSILOXANE) AND MICROSPHERES

BACKGROUND OF THE INVENTION i Field of the Invention

This invention relates to a composition comprising a homogeneous, viscous continuous phase and a discontinuous phase of hollow, organic polymer microspheres; the invention also relates to a buoyant putty of such composition in which sinkable objects can be wrapped or embedded to keep them afloat, for example if accidentally dropped overboard from a boat, and for other applications.

ii Description of Prior Art

Through being denser than the medium in which they have been immersed, many objects that would otherwise endure at least a brief wetting, are often irretrievably lost upon accidental release into deep, clouded or cluttered water, through sinking. Such accidental release may occur during the course of recreational or commercial activities; from a ship, boat, dock, shore, or the body of a wader or swimmer; into a pond, pool, canal, swamp, river, lake or ocean; objects commonly lost in such fashion include glasses, pens, watches, combs, coins, cards, keys, tools, instruments, utensils, jewelry, as well as rods, lures, hooks and other fishing accessories, that contain substantial quantities of metal, glass, ceramic, stone, bone, or most kinds of fibers, rubbers, resins or plastics, or even certain woods such as ebony.

Such losses are always annoying and often costly. It is often not practical, convenient or comfortable to keep such sinkable objects held or tied to a person, boat or shore at all times, nor to permanently incorporate low-density parts or materials into their design for the sole purpose of keeping them afloat in the event of accidental release. Certain buoys or other flotation devices exist of a shape or with accessories that allow them to be temporarily tied or fitted to particular types of sinkable objects during the use of these near water, to be later detached for easier transport or storage. One example of these is the "Aqua Float Rod Floater", from Marine Manufacturing Industries (M.M.I.) Inc., Ile des Soeurs (Montreal), PQ Canada, a "tubular split foam device that fits around a fishing rod between the handle and the first eyelet" (Marine Manufacturing Industries Inc., "Aqua Float: The Fisherman's Friend" (pamphlet), Montreal, PQ, Canada, 1995). Such devices, whether made of wood, plastic or other solid materials, that often contain either one or a few large enclosed spaces, or many small closed cells, that are filled with air or inert gas to reduce overall density, are often of size or shape unsuitable for use with other than a limited variety of sinkable objects. Even pieces of soft closed cellular foams, composed of elastic flexible material that imprisons numerous air bubbles in a permanent arrangement, for example some types of foam rubber or polyurethane, that can be wrapped around sinkable objects of various shapes, will tend to revert to non-wrapping shapes in an elastic manner unless restrained by ties, adhesives or envelopes. Also, though either rigid or soft foams can be cut to accomodate smaller sinkable objects, they cannot thereafter easily be re-joined for use with larger ones.

A better way to protect sinkable objects would use a material that is a putty of lowest possible density that can be inelastically deformed to a new stable shape that surrounds or otherwise holds a sinkable object without need for ties, adhesives or envelopes. Only a sufficient quantity of buoyant putty to float a smaller sinkable object need be detached from a larger mass; or, several such small quantities could be joined to be able to float a larger sinkable object, or to be stored or transported as a larger mass.

The lowest density that can be achieved with a homogeneous organic material that can be inelastically deformed, for example, unvulcanized rubber, oligoisobutylene or similar flowable hydrocarbon, is about 0.910 g/mL. Since this density is not much less than that of water, fresh water having a density of 1 g/mL, relatively large quantities of such material would be necessary to float most sinkable objects. To enable the greater buoyancy that would be necessary for practical applications, substantial quantities of air or other gas would therefore need to be incorporated, for the lowest possible overall density. However, a material that would be capable of inelastic deformation through flow would not be able to retain loose air bubbles, each of which would eventually break and release its air on contact with the outside surface, or merge on contact with other bubbles to form larger and still unstable voids, thus causing phase-separation within the mass, and even breaking it up to release a held sinkable object. Also, a flowable material that is homogeneous, even if buoyant, would continue to flow under even very mild forces, and thus would not be able to sufficiently retain a shape that could hold a sinkable object in the manner of a putty.

Surrounding each of many tiny air bubbles in its own light plastic membrane would allow them all to be retained, evenly dispersed, within the mass of a highly viscous fluid, yet allow them to slide past each other as a portion of the material is inelastically deformed to a new shape. Such a material would now be highly buoyant; moreover, it would have the desirable consistency and flow properties of a putty, by analogy with other heterogeneous composite mixtures that are putties.

A putty is generally formulated as a simple composite material that usually consists of a collection of discrete particles, such as powdered calcium carbonate as the discontinuous phase, suspended in a viscous liquid, such as oil as the continuous phase. A certain minimum force is required to overcome the static friction between the particles; below this critical force the material tends to retain the shape given it. This mechanical property has allowed "putties" or "caulks" to be used for centuries to seal small cracks in boats or housing, by forming a plug within a hole that, in contrast with flowable homogeneous materials, does not continue to flow out under gravity or water pressure. In general, the volume of viscous liquid in a putty must be sufficient to fill the voids between the particles, but not so much as to allow the particles to settle and the liquid to exude for the whole material to phase-separate. In the case of approximately spherical particles, the volume-to-volume ratio of continuous to discontinuous phases would thus be a function of geometry, that is independant of the average size of the particles, though a larger distribution of particle sizes makes for relatively less void space available to be filled by liquid. The same volume-to-volume ratio for a putty would be more or less independent of the chemical compositions of the two phases, though their weight-to-weight ratio would depend on their relative densities. A classic composition uses ca. 15% w/w (which corresponds to 34% v/v) of water-insoluble vegetable oil as continuous phase, with inorganic whiting (powdered calcium carbonate) as discontinuous phase; other compositions substitute Fuller's earth (clay) for the discontinuous phase. More modern compositions use low-molecular-weight polysulphides, silicones, or oligomeric hydrocarbons as the "oil" or "continuous" phase, and a wide variety of materials as "filler" or "discontinuous phase". Sometimes also the continuous phase consists of or includes monomer that can be cured to a rigid matrix after the desired shape has been formed.

The required qualities for a composition of matter that would be a buoyant putty to hold sinkable objects would be: lowest possible density for maximum buoyancy; malleability towards deliberate shaping by hand without the mass breaking or crumbling, yet sufficient stiffness that it does lose hold of a sinkable object through flow due to gravity or normal manipulation of the object; self-adhering and cohesive so that it does not crumble or break upon deliberate hand manipulation, and that it can be made to wrap around a sinkable object as a continuous ring or band and thus hold it against forces of gravitation or normal manipulation, yet not adhesive and not leaving either solid crumbs or liquid stains on hands and other surfaces; non-toxic towards handling or accidental ingestion; odourless and resistant to decay; inert and non-adsorbant towards water; non-flammable and inert to air; not damaged by light, vibration or shock; retains essential mechanical properties within temperature of normal use, for example, $-40°$ C. to $+40°$ C.; long shelf and storage life without curing to a solid that cannot be shaped by hand, nor breaking down to a liquid that loses form due to mere gravity or normal manipulation of a held sinkable object; can be made brightly coloured, reflective, fluorescent or phosphorescent for easy location of held sinkable object on water surface; ease and low cost of production. Though able to function as a buoyant putty by itself, optionally such a composition of matter could also be enclosed in a flexible envelope which need not be impermeable to liquids, for example a woven or knitted fabric, that could also be fitted with ties or adhesives to better hold or contain a sinkable object.

The prior art has no examples that meet all these requirements together.

U.S. Pat. No. 5,459,959 to Daniel L. Paradis issued Oct. 24, 1995 describes a "Fish strike indicator composition" that is a moldable, buoyant composition comprising either unexpanded or expanded EXPANCEL® expandable thermoplastic microspheres dispersed in equal volumes of corn syrup or other sugar component, and hydrocarbon resin. While still in unexpanded form, the EXPANCEL® microspheres are mixed with the other components, then the entire composition is heated in a microwave oven to expand the microspheres to their final size and fill the package. This composition has the disadvantages of being sticky, subject to biodegradation, and detectably water-absorbing, which last the inventor suggests can be offset by adding hydrophobic silica—a relatively dense ingredient—in mass equal to the microspheres. This same patent also mentions "Strike Putty #835L", sold by ORVIS® Company of Manchester Vt. USA, a "clay like" material composed of glass microballoons and hydrocarbon resins, which has the disadvantages of relatively poor buoyancy (density 0.6 g/mL), and a tendency to absorb water on repeated or prolonged use.

U.S. Pat. 5,421,874 to Tony M. Pierce issued Jun. 06, 1995 describes a "composite microsphere and lubricant mixture" for use within flexible containers cushions and padding, in which the microspheres can be plastic and the lubricant can be silicone-based, possessing "a low specific gravity, low thermal mass, low coefficient of heat transfer, insulative and flotation qualities". This patent specifies that the lubricant must be a low-viscosity liquid, such as soapy water or other liquid of similar consistency, explicitely excluding more viscous "lubricants which impede rather than facilitate sliding and rolling movement of spherical objects with each other, such as stiff wax", so that the entire composite mixture has a "low shearing force threshold", being "quick to flow" that it may function as a cushioning material in a chair or bed without even temporarily-perceptible bumps, which would be a disadvantage for a buoyant putty that must be sufficiently stiff and strong to retain a sinkable object against gravity and normal manipulation of the object, and that thus requires a highly viscous liquid as the continuous phase. Again with the object of making the composition less stiff, this patent also specifies that the low-viscosity "lubricant means is present on the exterior surface of essentially all of said spherical objects, but in a quantity less than would cause dispersion of said spherical objects in said lubricant means", with a preferred embodiment of 1 g/mL liquids being mixed with plastic microspheres to give a "specific gravity for the composite mixture of about 0.2 to 0.25 or less", which composition would have the disadvantage in a buoyant putty of having a low cohesive strength for holding a sinkable object; mention of other embodiments with densities "above 0.50" clearly refers to compositions with denser continuous, for example, fluorocarbon, or discontinous, for example, solid or thicker-walled glass, ceramic or metal microspheres phases, rather than higher volume-to-volume ratio of continuous-to-discontinuous phases. This prior art would also have the disadvantage of the composition having to be confined in a liquid-impermeable flexible bladder or flexible container, to keep the mass from flowing or breaking apart due to low shearing force threshold and low cohesive strength respectively, and to block the exudation of its low-viscosity liquid.

Other U.S. Pat. Nos. namely, 5,362,543 to Lincoln P. Nickerson issued Nov. 08, 1994, 4,728,551 to Eric C. Jay issued Mar. 01, 1988, and 4,255,202 to Jack C. Swan issued Mar. 10, 1981, all describe "flowable pressure compensating fitting materials which are used in seating applications". Here the continuous phase is a low-viscosity oil or a more viscous mixture of oil with wax, fatty amide or denser colloidal silica that form a fine suspension in the oil, and the discontinuous phase consists of hollow glass or plastic microbeads to reduce overall density to some extent. In particular, the Nickerson patent teaches a continuous phase made of an oil that is a poly(dimethylsiloxane) of viscosity below 100 cstks, together with at least 3 wt % of a fatty amide thickener that is insoluble in the oil. All these materials have the disadvantage that the low-molecular weight oil is able to seep past the suspended wax microcrystals or fatty amide particles or colloidal silica that are meant to increase its apparent bulk viscosity, as well as past the microspheres, so as to collect at the surface of a portion of the material, thus requiring a liquid-impermeable flexible envelope to contain such exudation, and tending to exhibit phase-separation even within such envelope. For similar reasons, these materials also have the disadvantage of low cohesive strength for a buoyant putty holding a sinkable object.

U.S. Pat. No. 5,202,362 to Jules J. Hermale issued Apr. 13, 1993 describes a composite of silicone fluid and thermoplastic microspheres, but the silicone fluid is again of low viscosity (20,000 centistokes=20K cstks) that would mean low cohesive strength and exudation, and moreover contains reactive groups so that it can be cured to a solid mass upon injection into the ear, which would be disadvantageous for a moldable buoyant putty. Prior art U.S. Pat. Nos. 4,000,108 to Yokokawa et al issued Dec. 28, 1976 and 4,861,804 to Nakanishi issued Aug. 29, 1989 for polysiloxane-microsphere composites also employ polysiloxanes that are curable so as to crosslink to non-flowing gels with the same disadvantage.

SUMMARY OF THE INVENTION

It is an object of this invention to provide a composition of matter that is a viscous mixture of poly(dimethylsiloxane) and hollow plastic microspheres that can hold sinkable objects to keep them afloat.

It is another object of the invention to provide a buoyant putty that is a composition of matter comprising low-density, gas-filled microspheres dispersed in a viscous hydrophobic fluid medium, being at once very buoyant and having the mechanical properties normally associated with putties.

It is another object of this invention to provide a composition that is of lowest possible density for highest possible buoyancy.

It is another object of this invention to provide a composition that is malleable enough to be shaped, separated or joined by deliberate hand manipulation so as to be made to hold a sinkable object, yet stiff enough to retain its form without sag or flow in the absence of such deliberate manipulation, and to continue to hold a sinkable object against separation and sinking.

It is another object of this invention to provide a composition which can provide a smooth surface and can closely conform to the exterior of a sinkable object.

It is another object of this invention to provide a composition that is cohesive enough not to crumble or break while being moulded, unless deliberately pulled apart.

It is another object of this invention to provide a composition that can be divided or joined by deliberate hand manipulation to produce pieces of the desired size to hold a particular sinkable object.

It is another object of this invention to provide a composition that does not adhere to, nor leave solid or liquid residue, on either the hands during moulding, the sinkable object it holds, or any surface it may rest upon, alone or while holding a sinkable object, for short or prolonged periods.

It is another object of this invention to provide a composition that can hold a sinkable object by wrapping either completely or only partially around it.

It is another object of this invention to provide a composition that can be deliberately removed from a sinkable object and stored, to be later reused to hold another.

It is another object of this invention to provide a composition that is unaffected by water.

It is another object of this invention to provide a composition that is odourless, nontoxic, non-flammable, and stable for long periods towards heat, cold, vibration, shock, air, light and microbial action.

It is another object of this invention to provide a composition that can be coloured or otherwise made visible against a water surface or most other backgrounds from a distance under poor lighting conditions.

It is another object of this invention to provide a composition that is easy to produce by moderately rapid blending of available ingedients.

It is another object of this invention to provide a composition that optionally may be enclosed in a flexible envelope which need not be liquid-impermeable, for example a knitted or woven fabric.

It is another object of this invention to provide a composition that can be employed for other applications in which its lightness, stiffness and insulating abilities would be advantageous.

In accordance with the invention there is provided a composition having a homogeneous, viscous continuous phase comprising a poly(dimethylsiloxane), and a discontinuous phase of hollow organic polymer microspheres, said continuous phase having a viscosity greater than 100,000 cs, and less than a viscosity corresponding to a penetration number of 500.

In accordance with another aspect of the invention, there is provided a method of rendering an object which sinks in water, buoyant in water comprising applying about the object a buoyant putty composition of the invention in an amount to render the object buoyant in water.

In accordance with a particular embodiment of the invention there is provided a buoyant flotation putty for supportably floating in water an object which sinks in water comprising a homogeneous, viscous continuous phase of a viscous hydrophobic liquid vehicle and a discontinuous phase comprising hollow, organic polymer microspheres, said continuous phase being present in an amount sufficient to fill the void volume between the hollow microspheres but not substantially more, said putty having a density less than that of water such that said putty floats in water, said putty being co-adhesive while exhibiting low adhesion.

DETAILED DESCRIPTION OF THE INVENTION

The composition of the invention has particular application as a buoyant putty suitable for supportably floating in water an object which would otherwise sink in water. The object may be wrapped or embedded in a suitable amount of the putty to render it floatable in water.

When the composition is employed as a buoyant putty the continous phase is preferably employed in a volume which is sufficient to fill the void volume between the hollow microspheres, but not substantially greater than the void volume; the purpose of this is to minimize the density of the composition; employing a volume of the continuous phase greater than that required to fill the void volume has the effect of increasing the density of the putty and might thus render the putty non buoyant. Insofar as density may be less critical in other applications of the composition, this volume requirement for the continuous phase will be less important.

In the case where the composition is to form a buoyant putty, the composition suitably contains the continuous phase in an amount ranging from 25 to 39, preferably 26 to 31 parts, by volume, per 100 parts, by volume, of the composition; and the composition suitably has a density ranging from 0.26 to 0.40, preferably 0.27 to 0.32 g/ml.

The hollow organic polymer microspheres are also referred to herein as plastic microspheres and typically have a true density of less than 0.10 g/ml and a diameter of less than 1 mm; more especially they have a diameter ranging from 15 to 200 µm, with a mean diameter of about 100 µm.

The hollow microspheres forming the discontinuous phase are suitably present in the composition in an amount ranging from 61 to 75, preferably 69 to 74 parts, by volume, per 100 parts, by volume, of the composition.

The composition exhibits self-adhesion, in other words it is co-adhesive, but is non-tacky and displays low adhesion to surfaces.

Thus, when employed as a buoyant putty, an object is embedded in the composition or encased or enwrapped, at least in part, by the composition so that reliance is made on the cohesive nature of the composition to engagingly hold the object. It is not necessary that the object being completely enclosed by the composition and indeed this will not normally be desirable; thus, for example, a band of the composition may surround a portion of a fountain pen.

The hollow microspheres in the composition of the invention may be filled with air, or nitrogen or similarly inert gas. They should be as light as possible, yet strong enough so as not to be crushed while blending or using the composition. Organic polymer or plastic is therefore to be preferred over glass or ceramic as giving acceptable strength for the least mass, and as having a more hydrophobic native surface to adsorb less water. The plastic should be one able to withstand environmental conditions of strorage or use of the composition. Smaller microspheres give a smoother texture to the buoyant putty for a closer fit, and better grip, on the sinkable object being held; per unit volume used, smaller microspheres have more surface in contact with the intervening viscous liquid, for a more cohesive composition that is less prone to exudation and phase separation. Suitable microspheres include those available from PQ Corporation as PM 6545 Plastic Microspheres of polyacrylonitrile and polymethacrylonitrile, and which are sufficiently strong, light, 0.02 g/mL, heat-stable (to 120° C.), and small having a mean diameter ca. 100 µm, with 15–200 µm range.

For the composition of the invention to be sufficiently stiff and cohesive, it has been found that the viscosity of the continuous liquid phase must exceed 100,000 cstks (centistokes), and preferably exceed 200,000 cstks. This eliminates from consideration such hydrophobic liquids that are "oils"including peanut oil and other vegetable oils, epoxidized soybean oil, even "heavy" paraffin or mineral oils, and silicone oil or fluid of viscosity of 100,000 cstks or less. Of the more viscous hydrophobic oligomers and polymers that are liquids to −40° C., poly(isobutylenes) such as the Indopol(trade-mark) series H—40, H—300, H—1500 and H—1900 of increasing viscosity, from Amoco Inc., even and particularly when more viscous than 100,000 cstks, are unacceptably sticky to hands and other surfaces; so too are polyisoprenes that also contain reactive alkene groups that make them subject to viscosity change through autoxidation, while fluorocarbons are relatively dense and expensive, and polysulfides dense and typically smelly.

Poly(dimethylsiloxanes) are well-known for their antistick properties, which make them useful as mould-release agents. They are also used to coat textiles and other solid articles to confer water repellency, and as ingredients in cosmetics and polishes. The higher atomic number of silicon makes them slightly denser (0.98 g/mL) than saturated hydrocarbon polymers, but still less dense than even fresh water. These polymers are inert towards and repel water, though they will wet organic surfaces such as the surface of plastic microspheres; they are odourless, non-toxic, non-flammable, and very stable to air and light. The viscosity of mixtures of poly(dimethylsilicones) increases with their weight-average molecular weight: low-molecular weight mixtures are called silicone fluids or silicone oils, while higher molecular weight mixtures of barely discernable flow are called silicone gums. Poly(dimethylsiloxanes) do not become glassy solids until temperatures below −123° C., and are used as heating media to over +150° C. Though they can be chemically crosslinked with peroxides or by other means to form non-flowable soft or hard gels, in the absence of such curing agents they remain liquids with flow properties that do not greatly change with time, light, moderate heat, or contact with air or water.

General Electric Inc. supplies the Viscasil® series of poly(dimethylsiloxane) silicone fluids of 30K cstks (VISC—30M), 60K cstks (VISC—60M) and 100K cstks (VISC—100M), and others of viscosities below 100K cstks. However, it has been found that even the VISC—100M was not viscous enough to give a composition with plastic microspheres at any ratio that was sufficiently stiff, cohesive and non-exuding for use by itself as the continuous phase in a buoyant putty. The same company once supplied a 600K cstks silicone fluid, but this has been discontinued in recent years. Poly(dimethylsilicone) fluids of sufficiently high viscosity may be achieved by blending a silicone fluid of 100K cstks or less, with a high viscosity silicone gum such as SE30 of General Electric; SE30 is a poly(dimethylsiloxane) having a viscosity exceeding $10^6$ cstks, and a penetration number of 500 to 1500. The penetration number is used for describing the hardness or viscosity of asphalt or bitumen and other substances of similar consistency, with higher values denoting softness or lower viscosity: Corbett, L. W. and R. Urban (1985). Asphalt and Bitumen. *Ullmann's encyclopedia of industrial chemistry*. W. Gerhartz, Deerfield Beach Fla. USA, VCH Publishers. A.3: 169–188). Too much of the high viscosity silicone gum produces a fluid that is difficult to mix with the plastic microspheres, and gives a buoyant putty with properties not improved enough to warrant the extra cost, the gum being the most expensive component, and effort of mixing.

A continuous phase comprising a mixture of substantially equal parts of a silicone fluid of 30,000 cstks and a silicone gum having a penetration number of 500 to 1500 has been found especially suitable, however, it is within the skill of the art to formulate different continuous phases from poly(dimethylsiloxanes) of different viscosity, to produce a homogeneous blend having the required viscosity of the invention, so as to provide other compositions of the invention.

Another way of increasing the viscosity of a poly(dimethylsiloxane) fluid to the range required by the invention, particularly to resist flow under conditions of sudden mechanical shock or high shear, is by heating it with 0.1–5 parts of added boric oxide, boric acid, or a boric acid ester, for example, triethyl borate, per 100 parts of poly(dimethylsiloxane), together with a small amount of ferric chloride or other catalyst, as taught by U.S. Pat. Nos. 2,541,851 to G. E. Wright issued Feb. 13, 1951 and 2,431,878 to R. R. McGregor and E. L. Warrick issued Dec. 02, 1947. A composition of this with other additives selected from glycerol, soapy water, zinc hydroxide and oleic acid to modify the elasticity of the mixture has been marketed under the name of "Silly Putty"®.

Among the substances that can be added to a liquid to increase its apparent viscosity, those that do so by forming a microcrystalline suspension without dissolving in the liquid, such as wax, fatty amide or colloidal silica in poly(dimethylsiloxane) fluid, are less able to retain them against undesired exudation or phase-separation, than higher-molecular weight analogs of the liquid's molecules, such as silicone gum in silicone fluid, or other substances that dissolve homogeneously in the liquid and have higher affinity for its molecules.

A typical formulation of the invention consists of, by volume, 13.5 parts of SE30 silicone gum, 13.5 parts of VISC—30M silicone fluid, and 73 parts of PM6545 Plastic Microspheres. These ingredients may suitably be combined in a sealed plastic bag, and blended together by manipulating the outside of the sealed bag by hand so that the contents are subjected to a stretching and folding action. The result is a white, stiff, mouldable white mass, that is a composition of the invention and a buoyant putty. The density of the product was measured at 0.28 g/mL, by pressing a portion into a measuring spoon of known volume, scraping off the excess and weighing. Another portion of this product felt dry, and did not stick nor leave visible liquid or solid residue when briefly pressed onto hands, leather, wood, linoleum, or woven or knitted cotton, rayon or nylon fabrics or other opaque non-reflecting surfaces; the slightly visible greasy spot left after pressing on clear or reflective glass or plastic could easily be removed with soap and water. Even after prolonged handling of another portion, only a slight and not unpleasant oiliness, and no stickiness, were felt on the hands. Another portion that was wrapped in finely woven cotton fabric remained contained even after extensive manipulation, the exterior of the fabric only acquiring a slightly more oily feel, and a quality of water-repellancy. Another portion retained its approximately spherical shape without sagging for over four months while resting on a solid surface. Another portion that was rolled into a cyclinder 1 cm wide by 1–3 cm long could be folded 180° without large breaks appearing in its surface, thus establishing its cohesiveness. Over a wide range of viscosities for the continuous phase, samples prepared with relatively more of the microspheres were not cohesive by this last test, even crumbling into several pieces during moulding efforts, probably due to the amount of continuous phase fluid component not being sufficient to fill the void volume between the microspheres. Other samples with less of the microspheres component and more silicone fluid or gum components were denser and no stiffer or stronger. Many other combinations of silicone gum and fluid, including less of the gum with a greater portion of more viscous fluid such as VISC—60M or VISC—100M, gave putties of similar consistency when mixed with the same proportion of the plastic microspheres.

A machine capable of similar stretching and folding action, as is done for bread or other dough, such as the planetary Hobart type, or the horizontal-spindle model from Ross Inc., is suited for preparation of the composition of the invention on a larger scale without rupturing the microspheres.

Buoyant putties similarly prepared using mixtures of silicone fluid or gum with even small quantities of polyisobutylene were noticeably and unpleasantly sticky.

Besides adding a silicone gum of higher molecular weight, another way of increasing the viscosity of a silicone fluid for use in the buoyant putty composition of the invention, particularly so that it would resist flow under conditions of sudden mechanical shock or high shear, is to heat it with 0.1–5 parts of added boric acid, oxide or boric acid ester per 100 parts of poly(dimethylsiloxane), together with a small amount of ferric chloride or other catalyst. The presence of boron compounds would however make this embodiment of the invention at least slightly toxic by ingestion.

The ability of the composition to be coloured was demonstrated by mixing in 1 wt% of "Cadmium Red" fine pigment. The putty was coloured uniformly red throughout without substantial change in density or consistency.

It would help protect a portion of the buoyant putty of the invention, and the underlying object it holds or encloses, against sudden crushing, scratching, gouging, tearing, piercing or cutting damage, to use borate-containing poly(dimethylsilicone) in its composition, or to enclose it with a strong flexible envelope that is either impermeable to liquids, or that is a woven or knitted fabric that is permeable to liquids.

The composition of the invention also has other useful qualities of softness, lightness, flexibility, stiffness, shock absorbance, non-toxicity, and thermal, vibration and acoustic insulation, that would also make it useful as a packaging material, or as an insulating component in the floors, ceilings or walls of studios, theatres, engine rooms, or other rooms or buildings, or of freezers, refrigerators, coolers, incubators, ovens or other temperature-controlled areas or devices, or of aircraft, boats, cars and other vehicles, or of speakers, microphones or other acoustic devices, or as a filler for lining or padding in boots, jackets, suits, lifejackets, armour, and other articles of regular, sports, work, recreational, police, combat or emergency clothing, or in seats, cushions, pads, beds, grips and other cushioning or vibration-damping devices or furniture, or in medical or veterinary prostheses.

I claim:

1. A composition inert to water having a homogeneous, viscous liquid continuous phase consisting of polydimethylsiloxane and a discontinuous solid phase of hollow, gas-filled organic polymer microspheres, said polydimethylsiloxane being a mixture of a silicone fluid having a viscosity of not more than 100,000 cs and a silicone gum having a viscosity corresponding to a penetration number of 500 to 1500, said continuous phase having a viscosity greater than 100,000 cs and less than a viscosity corresponding to a penetration number of 500.

2. A composition according to claim 1, in which said continuous phase is present in an amount which ranges from 25 to 39 parts, by volume, based on 100 parts, by volume, of the composition.

3. A composition according to claim 1, having a density ranging from 0.26 to 0.40 g/mL.

4. A composition according to claim 1, in which said continuous phase is present in an amount which ranges from 26 to 31 parts, by volume, based on 100 parts, by volume, of the composition.

5. A composition according to claim 1, having a density ranging from 0.27 to 0.32 g/mL.

6. A composition inert to water having a homogeneous viscous liquid continuous phase consisting of polydimethylsiloxane and a discontinuous solid phase of hollow, gas-filled organic polymer microspheres in which said polydimethylsiloxane is a mixture of equal parts of a silicone fluid having a viscosity of about 30,000 cs, and a silicone gum having a penetration number of 500 to 1500, said continuous phase having said viscosity greater than 100,000 cs, and less than a viscosity corresponding to a penetration number of 500.

7. A composition according to claim 1, in which the hollow gas-filled organic polymer microspheres contain a gas selected from air or inert gases.

8. A composition according to claim 1, in which the hollow gas-filled organic polymer microspheres have a true density of less than 0.01 g/mL.

9. A composition according to claim 1, in which the hollow gas-filled organic polymer microspheres are less than 1 mm in diameter.

10. A composition according to claim 1, in which the hollow gas-filled organic polymer microspheres have a diameter ranging from 15–200 μm, with a mean diameter of about 100 μm.

11. A composition according to claim 1, in which the hollow gas-filled organic polymer microspheres are expanded by heat to their final size only after mixing with the continuous phase.

12. A composition according to claim 1, that further comprises up to 2 wt % of pigment in fine particulate solid form.

13. A composition according to claim 1, wherein said continuous phase is present in an amount sufficient to fill the void volume between the hollow microspheres.

14. A composition according to claim 1, wherein said continuous phase comprises 26 to 31 parts, by volume, based on 100 parts by volume of the composition; said continuous phase filling the void volume between the hollow, gas-filled organic polymer microspheres and the hollow, gas-filled organic polymer microspheres have a diameter of from 15 to 200 µm, with a mean diameter of about 100 µm and comprise 69 to 74 parts, by volume, based on 100 parts, by volume of the composition; said composition having a density of 0.27 to 0.32 g/mL.

15. A composition according to claim 1, wherein said microspheres are hollow, gas-filled microspheres having a diameter of 15–200 µm, and a true density of 0.02 g/mL, said microsphere being present in an amount of 61 to 75 parts, by volume, based on 100 parts, by volume, of the composition.

16. A composition according to claim 7, in which the microspheres have a diameter ranging from 15 to 200 µm, with a mean diameter of about 100 µm, and said continuous phase contacts said microspheres and fills the void volume between the microspheres.

17. A composition according to claim 16, wherein said continuous phase comprises from 25 to 39 parts, by volume, based on 100 parts, by volume, of the composition.

18. A composition according to claim 17, having a density ranging from 0.26 to 0.40 g/mL.

* * * * *